(12) United States Patent
Jang

(10) Patent No.: US 10,428,997 B2
(45) Date of Patent: Oct. 1, 2019

(54) MOUNTING MEMBER

(71) Applicant: Jin Tae Jang, Seoul (KR)

(72) Inventor: Jin Tae Jang, Seoul (KR)

(*) Notice: Subject to any disclaimer, the term of this patent is extended or adjusted under 35 U.S.C. 154(b) by 0 days.

(21) Appl. No.: 15/541,777

(22) PCT Filed: Jan. 5, 2016

(86) PCT No.: PCT/KR2016/000044
§ 371 (c)(1),
(2) Date: Jul. 6, 2017

(87) PCT Pub. No.: WO2016/111517
PCT Pub. Date: Jul. 14, 2016

(65) Prior Publication Data
US 2018/0010727 A1     Jan. 11, 2018

(30) Foreign Application Priority Data

Jan. 6, 2015   (KR) .................. 10-2015-0001282
Dec. 16, 2015  (KR) .................. 20-2015-0008298

(51) Int. Cl.
*F16M 11/04* (2006.01)
*F16B 47/00* (2006.01)
(Continued)

(52) U.S. Cl.
CPC ........... *F16M 11/041* (2013.01); *B60R 11/02* (2013.01); *F16B 47/003* (2013.01); *F16M 11/10* (2013.01);
(Continued)

(58) Field of Classification Search
CPC ........ F16M 13/02; F16M 11/10; F16M 13/00; F16M 13/022; F16M 2200/022;
(Continued)

(56) References Cited

U.S. PATENT DOCUMENTS 1,320,439 A * 11/1919 Andresiak .............. A47B 23/02
                                                         248/447.2
2,481,271 A *  9/1949 Willey .................... H04M 1/04
                                                         248/159
(Continued)

FOREIGN PATENT DOCUMENTS

CA      2 908 911        10/2014
JP      3110890           7/2005
(Continued)

OTHER PUBLICATIONS

Extended European Search Report (EESR) for European Application No. 16 73 5138, dated Jul. 17, 2018.
(Continued)

*Primary Examiner* — Tan Le
(74) *Attorney, Agent, or Firm* — Kile Park Reed & Houtteman PLLC

(57) ABSTRACT

A mounting member for mounting a mobile device and a mobile device accessory of being fixed to one face of the mobile device and having a ring on an object, the mounting member includes a body, a slot portion being formed in a part of the body and having a receiving groove for receiving the ring and a pressing portion disposed inside the receiving groove and configured to elastically press the ring to be located in the receiving groove.

8 Claims, 14 Drawing Sheets

(51) Int. Cl.
*F16M 13/02* (2006.01)
*F16M 11/10* (2006.01)
*H04M 1/04* (2006.01)
*B60R 11/02* (2006.01)
*F16M 13/00* (2006.01)

(52) U.S. Cl.
CPC .......... *F16M 13/00* (2013.01); *F16M 13/022* (2013.01); *H04M 1/04* (2013.01); *F16M 2200/022* (2013.01); *F16M 2200/024* (2013.01); *F16M 2200/027* (2013.01); *F16M 2200/028* (2013.01)

(58) Field of Classification Search
CPC ......... F16B 47/003; H04M 1/04; H04M 1/11; B60R 11/02
See application file for complete search history.

(56) References Cited

U.S. PATENT DOCUMENTS

| | | | | |
|---|---|---|---|---|
| 3,632,073 | A * | 1/1972 | Nakatani | F16M 11/14 248/169 |
| 3,873,996 | A * | 4/1975 | Varteressian | A42B 3/0473 2/421 |
| 4,634,016 | A * | 1/1987 | Voss | A01K 97/04 220/629 |
| 8,317,152 | B1 * | 11/2012 | Zhou | F16M 11/041 248/122.1 |
| 8,567,739 | B2 * | 10/2013 | Zhou | F16M 11/10 16/326 |
| 2012/0211633 | A1 | 8/2012 | Zhou | |
| 2015/0144748 | A1 * | 5/2015 | John | D06F 58/22 248/94 |

FOREIGN PATENT DOCUMENTS

| | | |
|---|---|---|
| JP | 2005-209357 | 8/2005 |
| JP | 3159054 | 5/2010 |
| JP | 2014-209704 | 11/2014 |
| KR | 20-0270455 | 4/2002 |
| KR | 20-0411439 | 3/2006 |
| KR | 20-0453348 | 4/2011 |
| KR | 10-2012-0041348 | 5/2012 |
| KR | 20-2012-0005943 | 8/2012 |
| KR | 10-2014-0123649 | 10/2014 |
| WO | 2014/168374 | 10/2014 |

OTHER PUBLICATIONS

Japanese Office Action with English Translation for Japanese Patent Application No. 2017-535827, dated Aug. 7, 2018.
Japanese Office Action with English translation from Japanese Patent Office corresponding to Application No. 2017-535827 dated Apr. 2, 2019.
Communication pursuant to Article 94(3) EPC dated May 13, 2019 from the European Patent Office corresponding to European Patent Application No. 16735138.6.
Internatinoal Search Report for International Application No. PCT/KR2016/000044, dated Apr. 29, 2016.

* cited by examiner

MOUNTING MEMBER

CROSS-REFERENCE TO RELATED APPLICATIONS

This application claims priority under 35 USC § 119 to Korean Patent Application No. 10-2015-0001282 filed on Jan. 6, 2015 and Korean Utility Application No. 20-2015-0008298 filed on Dec. 16, 2015, the contents of which are herein incorporated by reference in its entirety.

BACKGROUND OF THE INVENTION

1. Field of the Invention

Example embodiments of the present invention relate to a mounting member. More particularly, example embodiments of the present invention relate to a mounting member for mounting a mobile device and a mobile device accessory including a ring to be fixed to a face of the mobile device to an object.

2. Description of the Related Art

Recently, a mobile device such as a portable media player (PMP) has come into wide use. Users have utilized various accessories in order to carry the mobile device easily. For example, a strap-type accessory which can bind one side of the mobile device helps the users to carry the mobile device conveniently.

While the mobile device generally operates while grasping the mobile device with hands, the mobile device may work occasionally with being positioned on a bottom face of a desk when the users watch a video for a long time.

When the mobile device is mounted on a particular position such as a vehicle, a bicycle, etc., a fixing member may be required for fixing the mobile device by using a clamping structure or a spring elastic structure.

The disadvantage of the clamping structure is that a size of the clamping structure must increase as a size of the mobile device increases. In recent years, as the sizes of smart phones and tablets have become larger and larger, there has been a problem that the size of a fixing member included in the clamping structure has to increase proportionally. Furthermore, the fixing member may be very obstructive to a view of a driver while driving the vehicle, and even when not in use, the clamping structure may occupy a wide area of a dashboard of the vehicle.

Further, the fixing member included in the clamping structure can grip the mobile device using a spring. Thus, the clamping structure is very vulnerable to external impacts such that there is a high possibility that a breakage of the spring occurs due to a shock while driving the vehicle or the bicycle on an uneven road. As a result, the spring may leave out of a clamper of holding the mobile device due to elastic characteristics.

SUMMARY OF THE INVENTION

Example embodiments of the present invention provide a mounting member for mounting a mobile device on an object stably.

According to one aspect of the present invention, there is provided a mounting member for mounting a mobile device and a mobile device accessory of being fixed to one face of the mobile device and having a ring on an object, the mounting member includes a body, a slot portion being formed in a part of the body and having a receiving groove for receiving the ring and a pressing portion disposed inside the receiving groove and configured to elastically press the ring to be located in the receiving groove.

In an example embodiment, the slot portion and the pressing portion may be formed parallel to each other.

In an example embodiment, the pressing portion may be formed using polymer resin.

In an example embodiment, the mounting member may further include a pressurizing part disposed to penetrate through a side wall of the body in a horizontal direction, the pressurizing part being configured to press the pressing portion to fix the ring.

In an example embodiment, the pressurizing part may have a screw structure or a lever structure.

In an example embodiment, the pressing portion may be disposed on one side wall or both side walls of the receiving groove, and the mounting member may further include a pressurizing part disposed to penetrate through the body to the pressing portion along a horizontal direction of the body to press the pressing portion disposed on one side wall or both side walls of the receiving groove such that the pressing portion fixes the ring.

In an example embodiment, the pressurizing part may include a bolt passing through the body and the pressing portion along the horizontal direction and a nut fastened to the bolt to press the pressing portion together with the bolt.

In an example embodiment, the pressurizing part may include a shaft passing through the body and the pressing portion along the horizontal direction and having one end fixed to the body and a lever hinged to the other end of the shaft opposite to the one end, and the lever capable of rotating with respect to the other end of the shaft to press or release the pressing portion.

In an example embodiment, the mounting member may further include a release preventing part being disposed to penetrate through a sidewall of the body in a horizontal direction to fix the ring received in the receiving groove to prevent the ring from being released from the receiving groove.

In an example embodiment, the release preventing part may include a protrusion penetrating the pressing portion and being slidable in the horizontal direction to make contact with an inside of the ring or to be spaced from the inside of the ring In an example embodiment, the release preventing part may include a push portion being provided inside the body to surround the slot portion, and having a button movable in the horizontal direction by a force externally pressed at one end, a hook formed at the other end of the push portion and adapted to fix the ring in the receiving groove as the ring is received in the receiving groove, and an elastic member being adjacent to the hook and being resiliently connected to the push portion to fix the hook in the receiving groove.

In an example embodiment, the body may include a fastening portion formed on a lower surface of the body to be fastend to the object by a screw or a sliding method.

In an example embodiment, the mounting member may further include an attaching part to attach a lower surface of the body to the object.

In an example embodiment, the attaching part may include a base housing coupled to a lower surface of the body and an adhesive member interposed between a lower surface of the base housing and the object to providing an adhesive force therebetween.

In an example embodiment, the attaching part may include a base housing coupled to a lower surface of the body, a base bottom plate disposed at a lower face of the base housing, and a suction plate being configured to be fastened to the base housing through the base bottom plate and to adsorb the object.

In an example embodiment, the attaching part may include a clamp being coupled to a lower surface of the body and having a through-hole formed in a horizontal direction.

According to one aspect of the present invention, there is provided a mounting member for mounting a mobile device and a mobile device accessory of being fixed to one face of the mobile device and having a ring on an object, the mounting member includes a body, a slot portion being formed in a part of the body and having a receiving groove for receiving the ring, and a release preventing part being disposed to penetrate through a sidewall of the body in a horizontal direction to fix the ring received in the receiving groove to prevent the ring from being released from the receiving groove.

In an example embodiment, wherein the release preventing part may include a protrusion being slidable in the horizontal direction to make contact with an inside of the ring or to be spaced from the inside of the ring In an example embodiment, wherein the release preventing part may include a push portion being provided inside the body to surround the slot portion, and having a button movable in the horizontal direction by a force externally pressed at one end, a hook formed at the other end of the push portion and adapted to fix the ring in the receiving groove as the ring is received in the receiving groove, and an elastic member being adjacent to the hook and being resiliently connected to the push portion to fix the hook in the receiving groove.

According to example embodiments, the mounting member includes a pressing portion on the side wall of the receiving groove formed in the slot portion, so that the ring received in the receiving groove can be stably mounted, even though the external impact is applied. Since the pressing portion is made of polymer resin having elasticity, the ring may be suppressed from slipping and further the abrasion of the pressing portion can be suppressed.

Further, since the pressurizing part is provided to press the pressing portion, the pressing portion can press the ring received in the receiving groove more strongly. As a result, the pressing portion can stably fasten the ring in the receiving groove.

In addition, the mounting member includes the release preventing part, so that the ring received in the receiving groove can be fixed to prevent the ring from being released from the receiving groove.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

Figure 1:
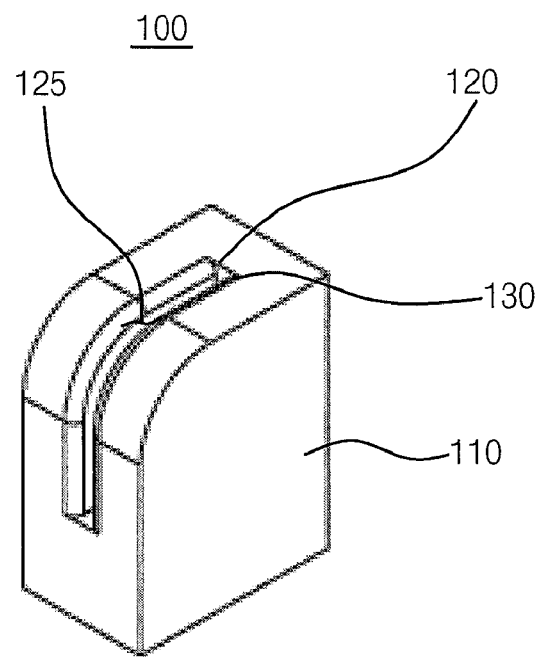
FIG. 1 is a perspective view illustrating a mounting member in accordance with an example embodiment of the present invention.

Hereinafter, mounting members are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element discussed below could be termed a second element without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
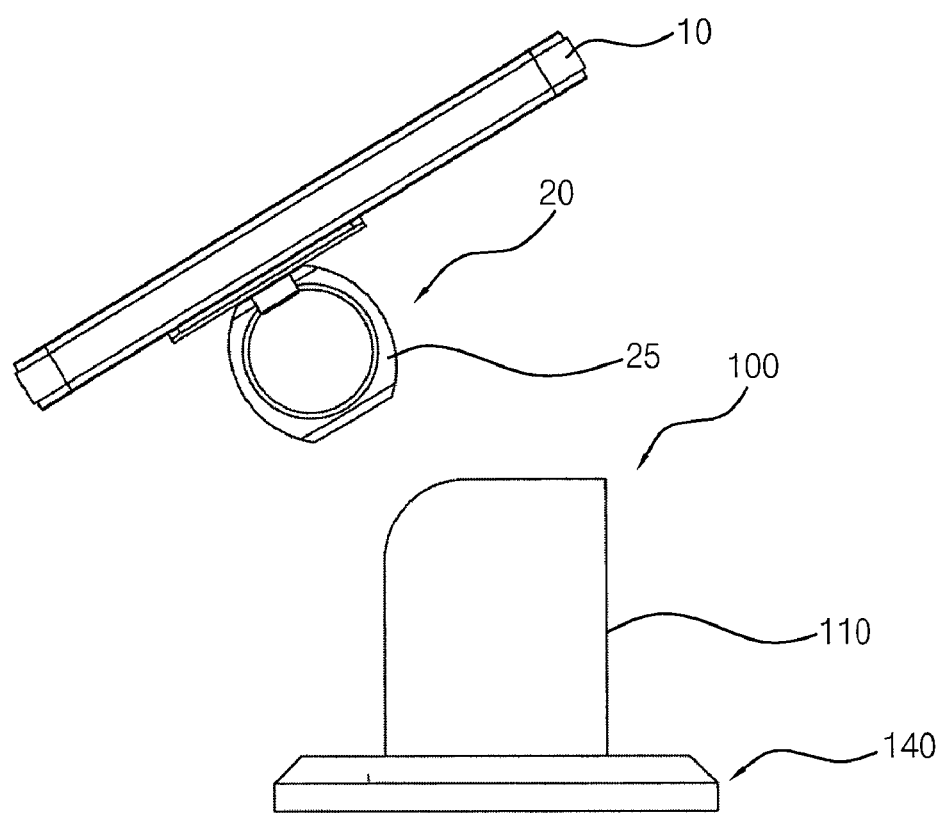
FIG. 2A is a side view illustrating a status of a mobile device and an accessory to be adapted to the mounting member in FIG. 1.
Figure 2B:
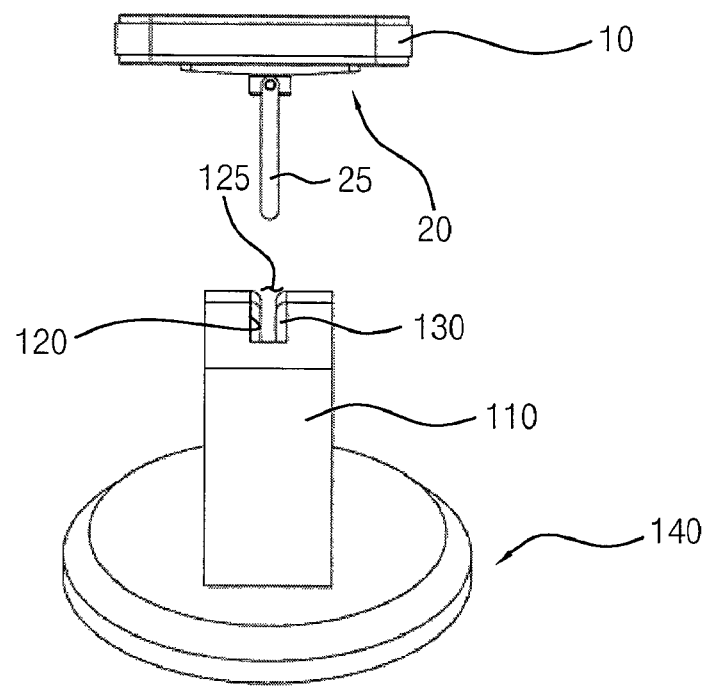
FIG. 2B is a perspective view illustrating a status of a mobile device and an accessory to be adapted to the mounting member in FIG. 1.
Figure 3A:
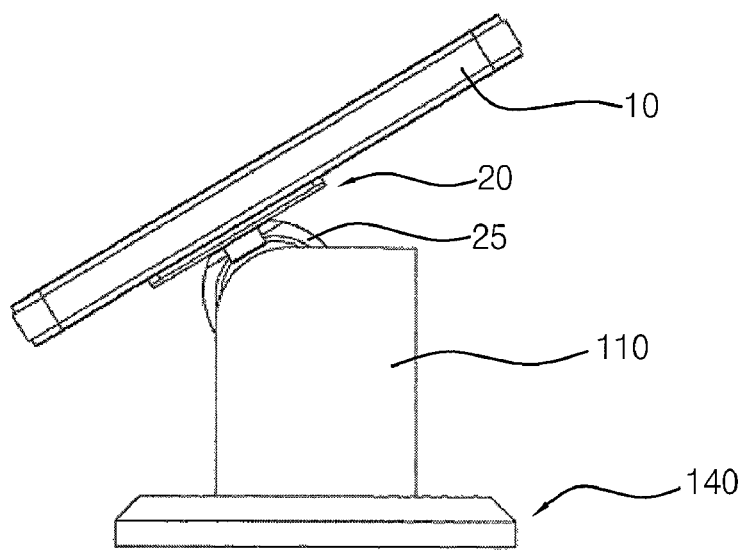
FIG. 3A is a side view illustrating a status of a mobile device and an accessory being adapted to the mounting member in FIG. 1.
Figure 3B:
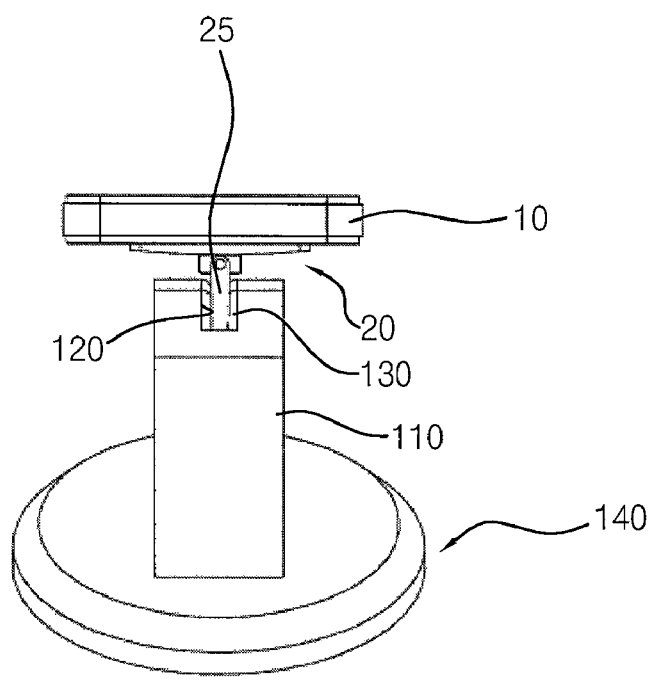
FIG. 3B is a perspective view illustrating a status of a mobile device and an accessory being adapted to the mounting member in FIG. 1.

FIG. 1 is a perspective view illustrating a mounting member in accordance with an example embodiment of the present invention. FIG. 2A is a side view illustrating a status of a mobile device and an accessory to be adapted to the mounting member in FIG. 1. FIG. 2B is a perspective view illustrating a status of a mobile device and an accessory to be adapted to the mounting member in FIG. 1. FIG. 3A is a side view illustrating a status of a mobile device and an accessory being adapted to the mounting member in FIG. 1. FIG. 3B is a perspective view illustrating a status of a mobile device and an accessory being adapted to the mounting member in FIG. 1.

Referring to FIGS. 1 to 3B, a mounting member 100 in accordance with an example embodiment includes a body 110, a slot portion 120 and a pressing portion 130. The mounting member 100 can be used for mounting a mobile device 10 and a mobile device accessory 20 having a ring 25 and being secured to one side of the mobile device 10 on an object. Examples of the mobile device 10 include a mobile phone, a PMP, an MP3 player, an electronic dictionary, a tablet PC, and the like.

Examples of the object include a cradle, a plate, a dashboard for a vehicle, a selfie stick, a handle bar of a bicycle and a motorcycle, and the like.

An example of the mobile device accessory 20 is described in detail in the specification of the Korean Patent Application No. 10-2013-0040554 filed on Mar. 12, 2013, the details of which will be omitted. Further, the mobile device accessory 20 may be variously modified as long as it has a ring 25 and is fixed to one face of the mobile device 10.

The body 110 may have a rectangular parallelepiped shape. A lower face of the body 110 may be fixed to an upper face of the object.

A chamfer is formed on an upper edge of the body 110. Accordingly, one side of the mobile device 10 can be supported on the body 110 in a state where the ring 25 is fastened to the mounting member 100.

The slot portion 120 is formed at a portion of the body 110. That is, the slot portion 120 may be formed at a side wall, an upper portion, or an edge of the body 110. For example, the slot portion 120 is formed at an edge where the chamfer is formed.

The slot portion 120 is formed with a receiving groove 125 in a vertical direction. Therefore, the receiving groove 125 may receive the ring 25. The slot portion 120 may also be formed in a horizontal direction.

The receiving groove 125 may be formed along an outer periphery of the ring 25. Thus, the ring 25 can be stably received in the receiving groove 125.

The pressing portion 130 is disposed inside the receiving groove 125, for example, on the side wall. The pressing portion 130 is provided so as to be in close contact with the side wall of the receiving groove 125. The pressing portion 130 can elastically press the ring 25 located in the receiving groove 125. Thus, the pressing portion 130 can stably hold the ring 25 located in the receiving groove 125. The pressing portion 130 may have a plate shape.

The pressing portion 130 may be provided on one side wall of the receiving groove 125 or may be disposed on both of the side walls to form a pair. The pressing portion 130 may be formed using a polymer resin having elasticity. Thus, when the pressing portion 130 directly contacts the ring 25, the pressing portion 130 may suppress the ring 25 from slipping. Further, the wear of the pressing portion 130 may be suppressed.

The pressing portion 130 may be made using an engineering plastic having excellent abrasion resistance such as polyacetal, MC nylon, polyurethane, polyisoprene, polybutadiene rubber, polyacrylate rubber, polyether rubber and the like.

The mounting member 100 according to an embodiment of the present invention includes the pressing portion 130 on the side wall of the receiving groove 125 formed in the slot portion 120 so that the ring 25 received in the receiving groove 125 can be stably clamped from an external impact. Since the pressing portion 130 is made of a polymer resin having elasticity, the slip of the ring 25 can be suppressed and further the wear of the pressing portion 130 can be suppressed.

Figure 4:
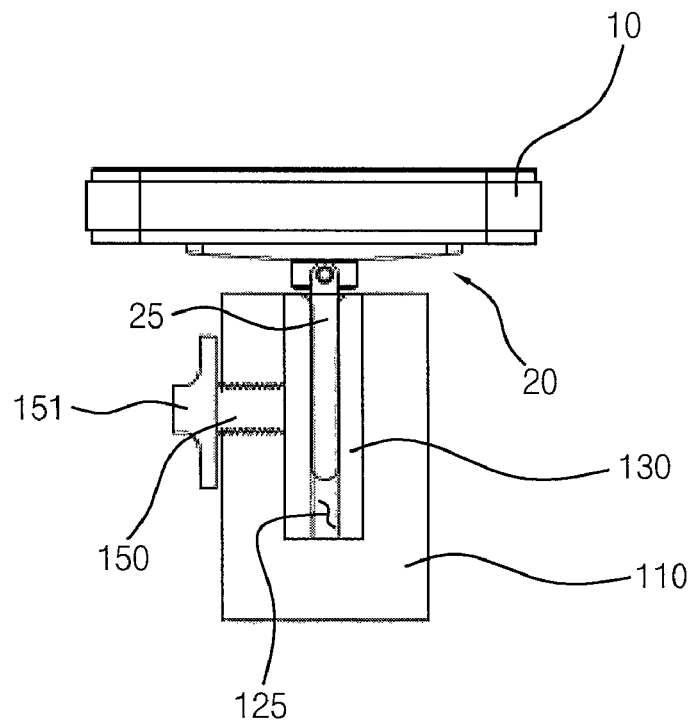
FIG. 4 is a front view illustrating a mounting member in accordance with an example embodiment of the present invention.

FIG. 4 is a front view illustrating a mounting member in accordance with an example embodiment of the present invention.

Referring to FIG. 4, a mounting member 100 according to an embodiment of the present invention includes a body 110, a slot portion 120, a pressing portion 130, and a pressurizing part 150.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

The pressurizing part 150 is provided to penetrate one side of the body 110. For example, the pressurizing part 150 passes through the body 110 in a horizontal direction. The pressurizing part 150 can press the pressing portion 130 to press a ring 25 received in a receiving groove 125 more strongly. Thus, the pressing portion 130 can stably fasten the ring 25 in the receiving groove 125.

The pressurizing part 150 may have a screw structure, for example. At this case, the pressurizing part 150 has a handle 151 at an end thereof. The user can press or relax the pressing portion 130 by rotating the pressurizing part 150 using the handle 151.

Figure 5:
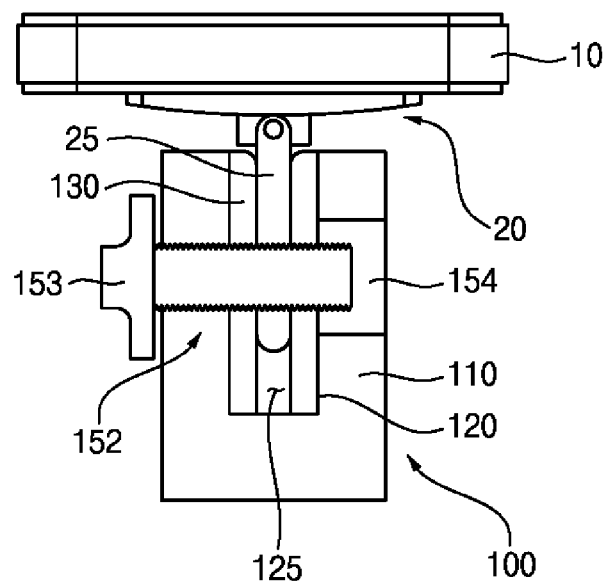
FIG. 5 is a front view illustrating a mounting member in accordance with an example embodiment of the present invention.
Figure 6:
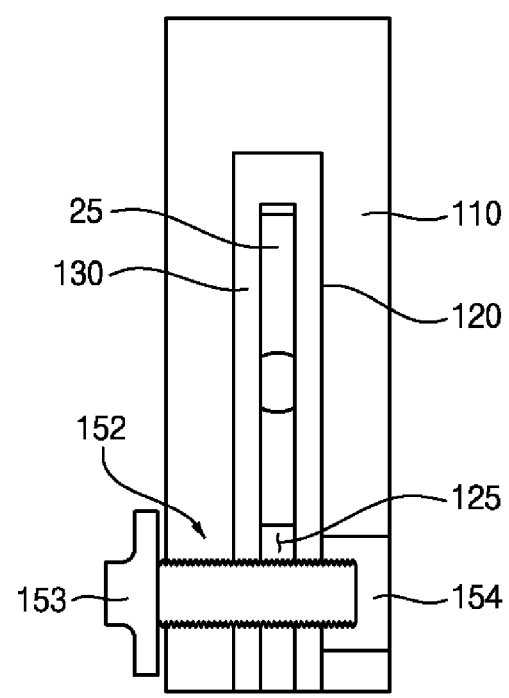
FIG. 6 is a plan view of the mounting member in FIG. 5.

FIG. 5 is a front view illustrating a mounting member in accordance with an example embodiment of the present invention. FIG. 6 is a plan view of the mounting member in FIG. 5.

Referring to FIGS. 5 and 6, a mounting member 100 according to an embodiment of the present invention includes a body 110, a slot portion 120, a pressing portion 130, and a pressurizing part 152.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

The pressurizing part 152 penetrates the body 110 and the pressing portion 130. For example, the pressurizing part 152 may pass through the body 110 and the pressing portion 130 along the horizontal direction of the body 110. The pressurizing part 152 presses the pressing portion 130 disposed on one side wall or both side walls of a receiving groove 125 so that the pressing portion 130 presses the ring 25 accommodated in the receiving groove 125 to press the ring 25 more strongly. Thus, the pressing portion 130 can stably fasten the ring 25 in the receiving groove 125.

The pressurizing part 152 may include a bolt 153 and a nut 154.

The bolt 153 penetrates the pressing portion 130 disposed on one side wall or both side walls of the body 110 and the receiving groove 125 along the horizontal direction. At this time, the bolt 153 may have a handle at one end. The bolt 153 can be easily rotated by using the handle.

The nut 154 is fastened to the bolt 153 and presses the pressing portion 130 together with the bolt 153. The bolt 153 and the nut 154 are tightened or loosened by rotating the bolt 153 by using the handle.

When the bolt 153 and the nut 154 are tightened, the bolt 153 and the nut 154 can simultaneously press the pressing portion 130 disposed on one side wall or both side walls. Therefore, the pressing portion 130 can press the ring 25 received in the receiving groove 125 more strongly.

When the bolt 153 and the nut 154 are loosened, the pressing portion 130 may be relaxed.

Figure 7:
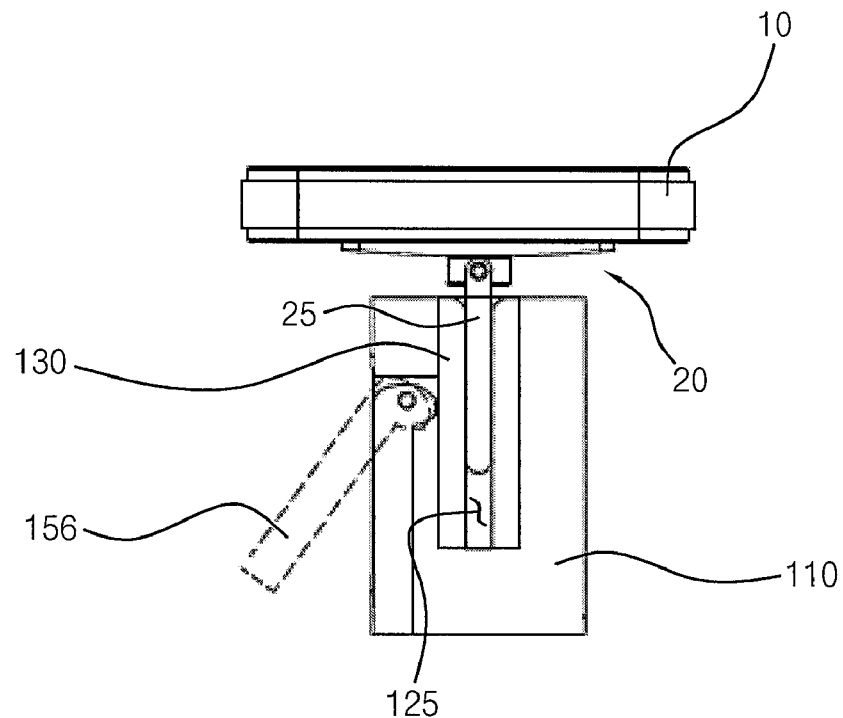
FIG. 7 is a perspective view illustrating a mounting member in accordance with an example embodiment of the present invention.

FIG. 7 is a perspective view illustrating a mounting member in accordance with an example embodiment of the present invention.

Referring to FIG. 7, a mounting member 100 according to an embodiment of the present invention includes a body 110, a slot portion 120, a pressing portion 130, and a pressurizing part 156.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

The pressurizing part 156 has, for example, a lever structure including a lever. At this time, the pressurizing part 156 can press or relax the pressing portion 130 by rotating the pressurizing part 156 by a user in a manner of rotating the lever.

Figure 8:
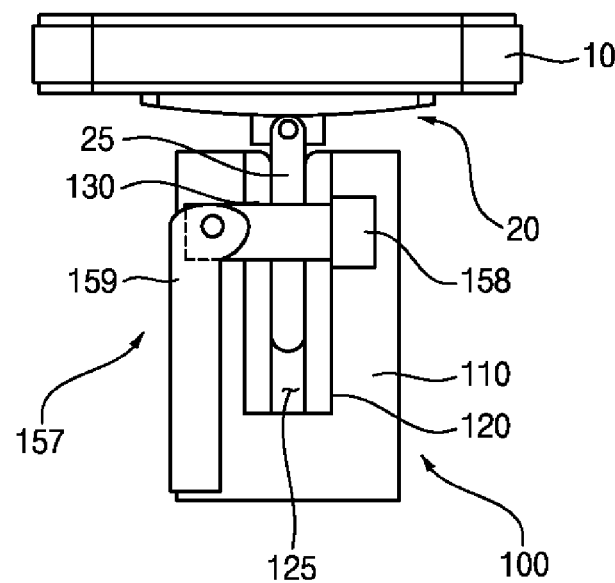
FIG. 8 is a front view illustrating a mounting member in accordance with an example embodiment of the present invention.
Figure 9:
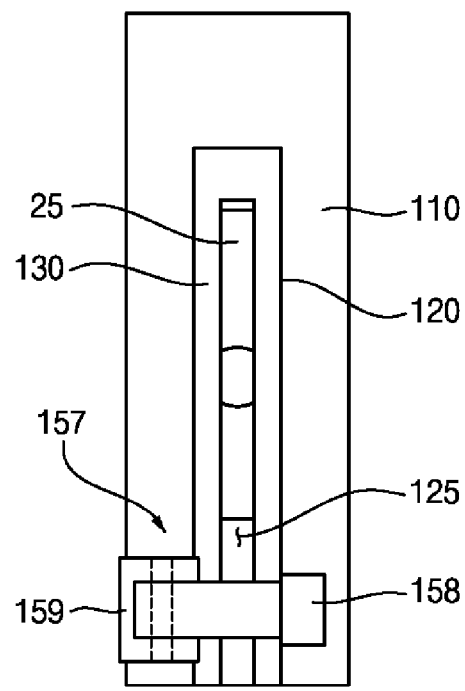
FIG. 9 is a plan view of the mounting member in FIG. 8.

FIG. 8 is a front view illustrating a mounting member in accordance with an example embodiment of the present invention. FIG. 9 is a plan view of the mounting member in FIG. 8.

Referring to FIGS. 8 and 9, a mounting member 100 according to an embodiment of the present invention includes a body 110, a slot portion 120, a pressing portion 130, and a pressurizing part 157.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

The pressurizing part 157 is provided to pass through the body 110 and the pressing portion 130. For example, the pressurizing part 157 pass through the body 110 and the pressing portion 130 along the horizontal direction of the body 110. The pressurizing part 157 presses the pressing portion 130 disposed on one side wall or both side walls of a receiving groove 125 so that the pressing portion 130 presses a ring 25 accommodated in the receiving groove 125 more strongly. Thus, the pressing portion 130 can stably fasten the ring 25 in the receiving groove 125.

The pressurizing part 157 may include a shaft 158 and a lever 159.

The shaft 158 passes through the pressing portion 130 disposed on one side wall or both side walls of the body 110 and in the receiving groove 125 along the horizontal direction. At this time, one end of the shaft 158 is fixed to the body 110. For example, the shaft 158 has a projection portion at the one end and can be fixed to the body 110 by the projection portion.

The lever 159 is hinged to other end of the shaft 158, opposite to the one end of the shaft 158. The lever 159 rotates with respect to the other end of the shaft 158 so that the projection portion of the shaft 158 and the lever 159 can press the pressing portion 130 or relax the pressing portion 130.

The projection portion of the shaft 158 and the lever 159 pressed against the pressing portion 130. In detail, both the shaft 158 and the lever 159 simultaneously press the pressing portion 130 disposed on the one side wall or the both side walls as well. Therefore, the pressing portion 130 can press the ring 25 received in the receiving groove 125 more strongly.

Figure 10:
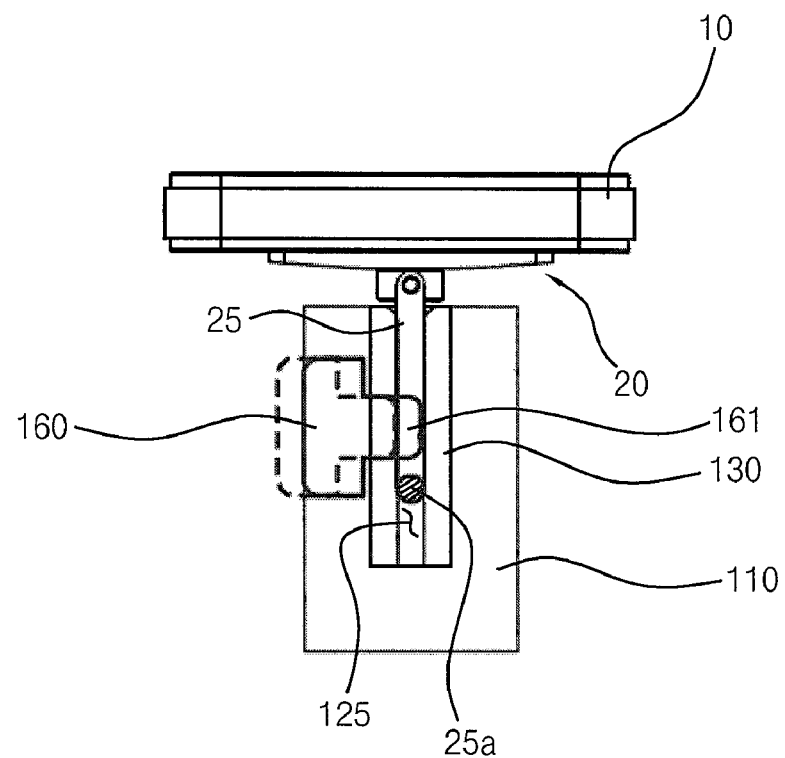
FIG. 10 is a perspective view illustrating a mounting member in accordance with an example embodiment of the present invention.

FIG. 10 is a perspective view illustrating a mounting member in accordance with an example embodiment of the present invention.

Referring to FIG. 10, a mounting member 100 according to an embodiment of the present invention includes a body 110, a slot portion 120, a pressing portion 130, and a release preventing part 160.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

The release preventing part 160 is disposed to pass through the side wall of the body 110 in a horizontal direction. The release preventing part 160 can secure a ring 25 received in a receiving groove 125 to prevent the ring 25 from being released from the receiving groove 125.

The release preventing part 160 passes through the pressing portion 130 and includes a protrusion portion 161. The protrusion portion 161 is provided so as to be slidable in the horizontal direction so as to make in contact with an inside of the ring 25 or to be spaced from the inside of the ring 25. Accordingly, when the user presses the release preventing part 160, the protrusion portion 161 included in the release preventing part 160 moves to the receiving groove 125 to make contact with the inside of the ring 25. Thus, the release preventing part 160 can prevent the ring 25 from being released from the receiving groove 125.

Figure 11:
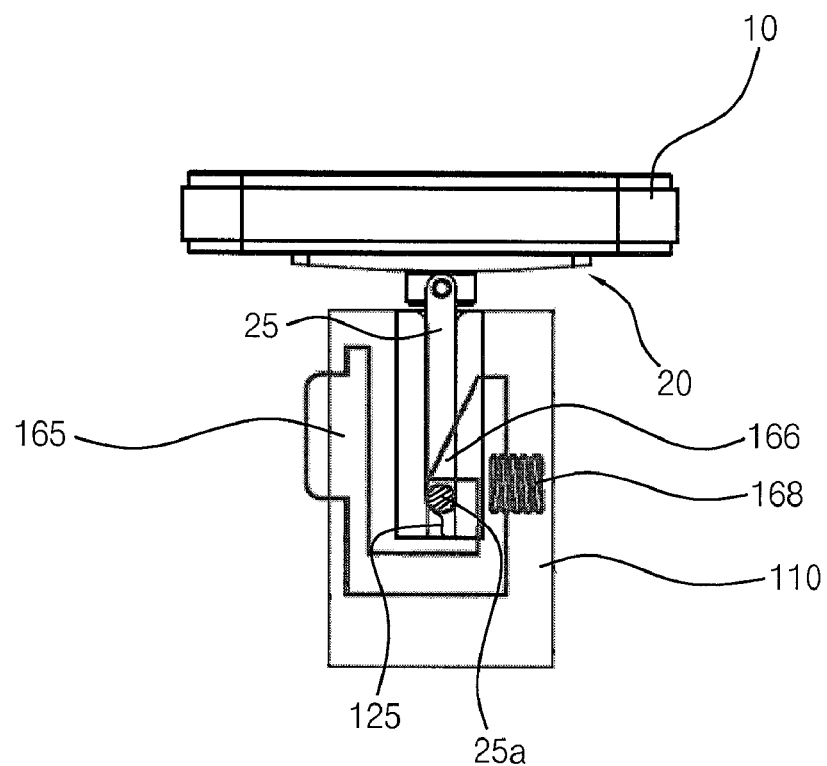
FIG. 11 is a perspective view illustrating a mounting member in accordance with an example embodiment of the present invention.

FIG. 11 is a perspective view illustrating a mounting member in accordance with an example embodiment of the present invention.

Referring to FIG. 11, a mounting member 100 according to an embodiment of the present invention includes a body 110, a slot portion 120, a pressing portion 130, and a release preventing part 160.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

The release preventing part 160 includes a push portion 165, a hook 166 and an elastic member 168.

The push portion 165 is provided inside the body 110 so as to surround the slot portion 120. Thus, the push portion 165 may have a U-shape. The push portion 165 may include a button formed at one end thereof, and movable in the horizontal direction by a force externally applied. Accordingly, when the user presses the button, the push portion 165 can move in the horizontal direction as a whole.

The hook 166 is formed at the other end of the push portion 165. The hook 166 is provided to fix a ring 25 in a receiving groove 125 when the ring 25 is received, in the slot portion 120. The hook 166 includes an inclined face inclined toward the inside of the push portion 165.

The elastic member 168 is adjacent to the hook 166 and is resiliently connected to the push portion 165. The elastic member 168 fixes the hook 166 to the receiving groove 125.

When the ring 25 is drawn into the receiving groove 125 from the outside, the push portion 165 moves in the horizontal direction as a whole and the elastic member 168 is compressed. The ring 25 is mounted on the receiving groove 125 along the inclined face formed on the hook 166.

Then, when the ring 25 passes the inclined face completely, the pushing portion 165 returns to an initial position by a restoring force of the elastic member 168. At this time, as the ring 25 is fastened to the hook 166, the ring 25 can be fixed to the receiving groove 125.

On the other hand, when the push portion 165 is pressed by an external force, the push portion 165 is moved in the horizontal direction as a whole, so that the hook 166 can release the ring 25.

Figure 12:
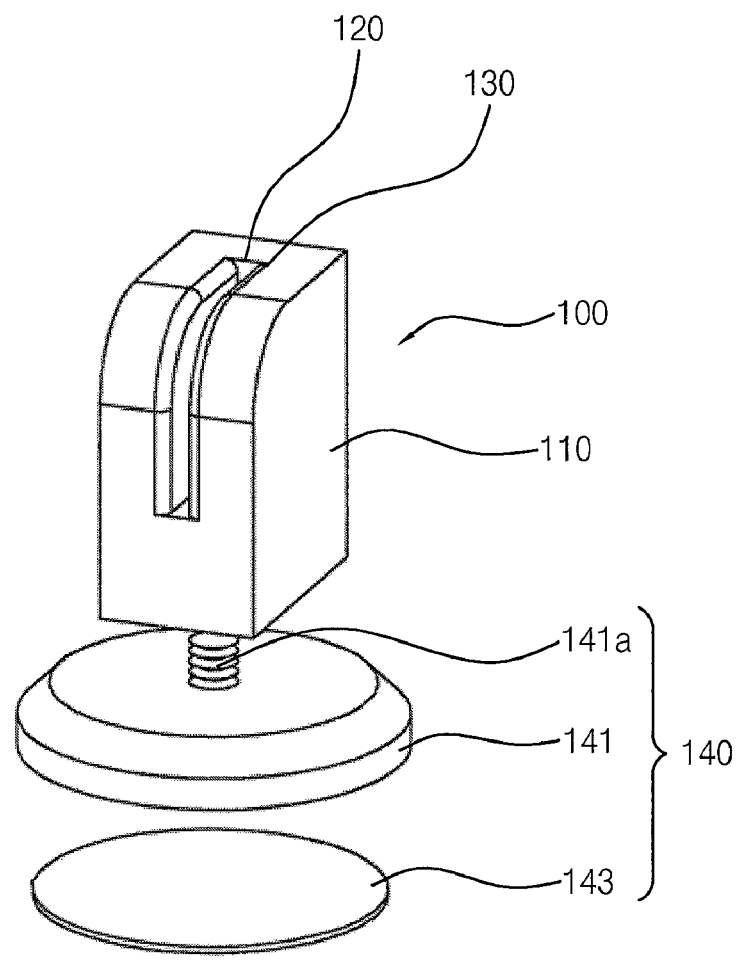
FIG. 12 is a perspective view illustrating a mounting member in accordance with an example embodiment of the present invention.

FIG. 12 is a perspective view illustrating a mounting member in accordance with an example embodiment of the present invention.

Referring to FIG. 12, a mounting member 100 according to an embodiment of the present invention includes a body 110, a slot portion 120, a pressing portion 130, and an attaching part 140.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

Further, the mounting member 100 may further include the pressurizing part 150, the pressurizing part 152, the pressurizing part 156, the pressurizing part 157 or the release preventing part 160 as illustrated with reference to FIGS. 4 to 11.

The attaching part 140 includes a base housing 141 and an adhesive member 143.

The base housing 141 is connected to a lower surface of the body 110. The upper face of the base housing 141 is provided with a joint portion 141a having a thread. A screw groove (not shown) is formed on the lower surface of the body 110. The joint portion 141a is screwed into the screw groove so that the attaching part 140 can be mounted on the body 110. That is, the attaching portion 140 and the body 110 have a screw connection structure.

In another example embodiment, the joint portion may be formed on the lower surface of the body 110, and a screw groove may be formed on the upper surface of the base housing 141.

The adhesive member 143 is interposed between the lower face of the base housing 141 and an object to provide an adhesive force. For example, the adhesive member 143 includes an adhesive tape or a magnetic substance having magnetism.

Figure 13:
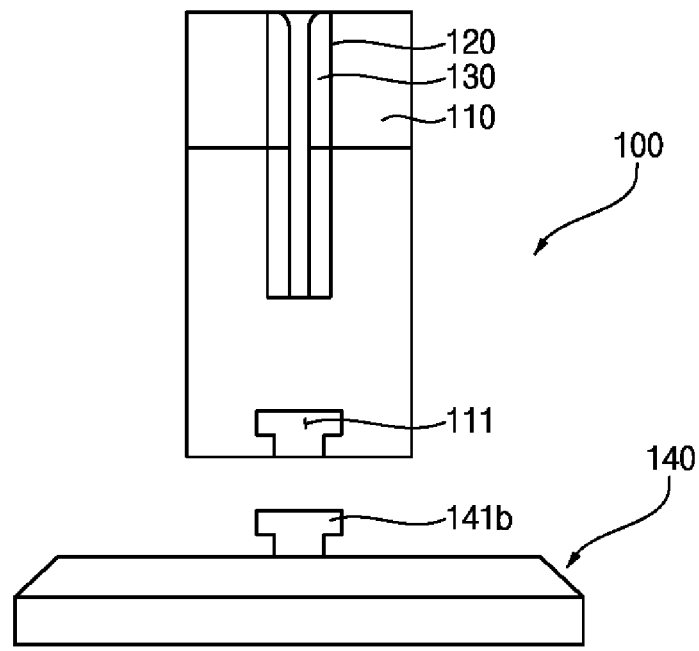
FIGS. 13 and 14 are front views illustrating a combining structure between the body and the attaching part in FIG. 12.
Figure 14:
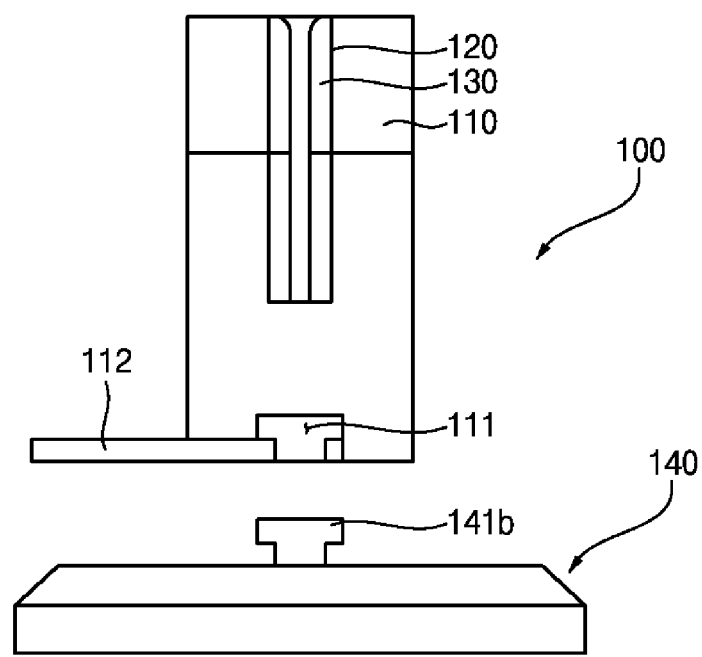

FIGS. 13 and 14 are front views illustrating a combining structure between the body and the attaching part in FIG. 12;

Referring to FIG. 13, a protrusion 141b extending in one direction may be formed on the upper surface of the base housing 141. For example, the protrusion 141b has a substantially 'T' shape. A coupling groove 111 having a shape corresponding to the shape of the projection 141b is formed on the lower surface of the body 110. The coupling groove 111 extends to one side of the body 110. The protrusion 141b slides through one side of the body 110 and is inserted into the coupling groove 111. Accordingly, the attaching part 140 can be mounted on the body 110. That is, the attaching part 140 and the body 110 have a sliding coupling structure.

In the meantime, the protrusion 141b may be formed on the lower surface of the body 110 and the coupling groove 111 may be formed on the upper surface of the base housing 141.

Referring to FIG. 14, a hook 112 may be provided on one side of the body 110 where the coupling groove 111 is formed. When the protrusion 141b is inserted into the coupling groove 111, the hook 112 opens the coupling groove 111. When the protrusion 141b is inserted into the coupling groove 111, the hook 112 is moved to block off the coupling groove 111. Therefore, it is possible to prevent the protrusion 141b from being detached from the coupling groove 111. That is, the attaching part 140 and the body 110 have a sliding coupling structure or a hook fixing structure.

The protrusion 141b may be formed on the lower surface of the body 110 and the coupling groove 111 and the hook 112 may be formed on the upper surface of the base housing 141.

In addition, the body 110 and the attachment portion 140 may be coupled to each other with various coupling structures.

Figure 15:
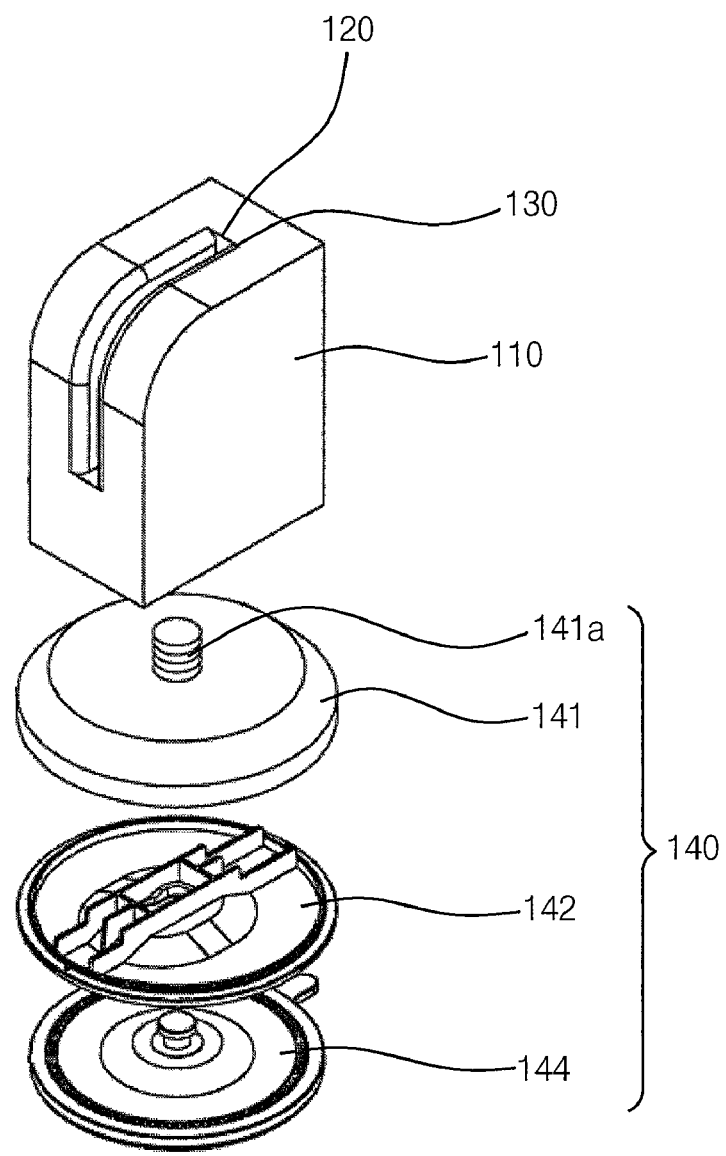
FIG. 15 is a perspective view illustrating a mounting member in accordance with an example embodiment of the present invention.

FIG. 15 is a perspective view illustrating a mounting member in accordance with an example embodiment of the present invention.

Referring to FIG. 15, a mounting member 100 according to an embodiment of the present invention includes a body 110, a slot portion 120, a pressing portion 130, and an attaching part 140.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

Further, the mounting member 100 may further include the pressurizing part 150, the pressurizing part 152, the pressurizing part 156, the pressurizing part 157 or the release preventing part 160 as illustrated with reference to FIGS. 4 to 11.

The attaching part 140 includes a base housing 141, a base bottom plate 142 and a suction plate 144.

The base housing 141 is coupled to a lower surface of the body 110. For example, the base housing 141 and the bottom surface of the body 110 are coupled to each other with a screw-coupling structure, a sliding-coupling structure, or a sliding-coupling structure and a hook-coupling structure.

The base bottom plate 142 is disposed at a lower portion of the base housing 141. The base bottom plate 142 may have a dome shape so that the suction plate 144 can be fastened.

The suction plate 144 is fastened to the base housing 141 through the lower base plate 142. The suction plate 144 is adsorbed on an object. The suction plate 144 may be adsorbed to the object using a vacuum force.

Figure 16:
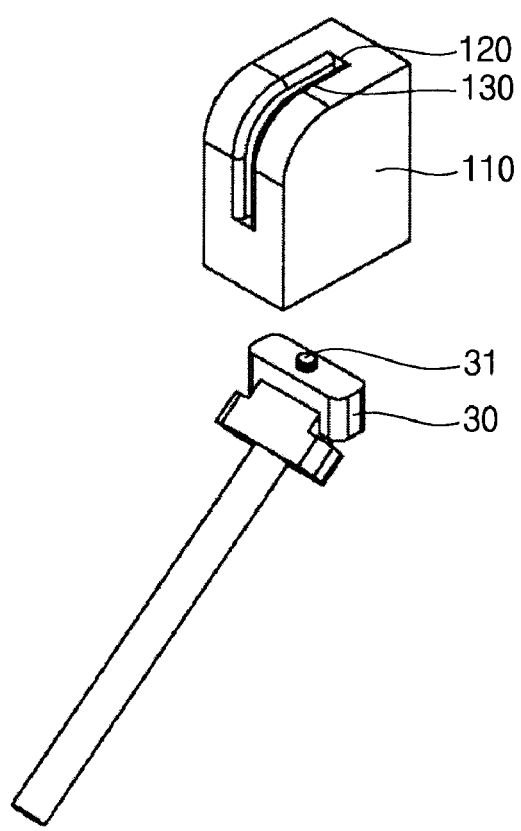
FIG. 16 is a perspective view illustrating a status of the mounting member in FIG. 1 to be mounted on an object.

FIG. 16 is a perspective view illustrating a status of the mounting member in FIG. 1 to be mounted on an object.

Referring to FIG. 16, a mounting member 100 according to an embodiment of the present invention includes a body 110, a slot portion 120 and a pressing portion 130 in order to mount a mobile device accessory on an object.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

Further, the mounting member 100 may further include the pressurizing part 150, the pressurizing part 152, the pressurizing part 156, the pressurizing part 157 or the release preventing part 160 as illustrated with reference to FIGS. 4 to 11.

For example, the object 30 is a selfie stick capable of taking an image using a mobile device in a self-camera mode. the selfie stick is provided with a fastening portion 31 formed with threads.

A screw groove (not shown) is formed on the lower surface of the body 110. The mounting member 100 can be mounted on the object by screwing the fastening portion 31 into the screw groove. That is, the mounting member 100 and the object have a threaded connection structure.

Meanwhile, the mounting member 100 and the object may have a sliding coupling structure, or may have the sliding coupling structure and the hook coupling structure.

Figure 17A:
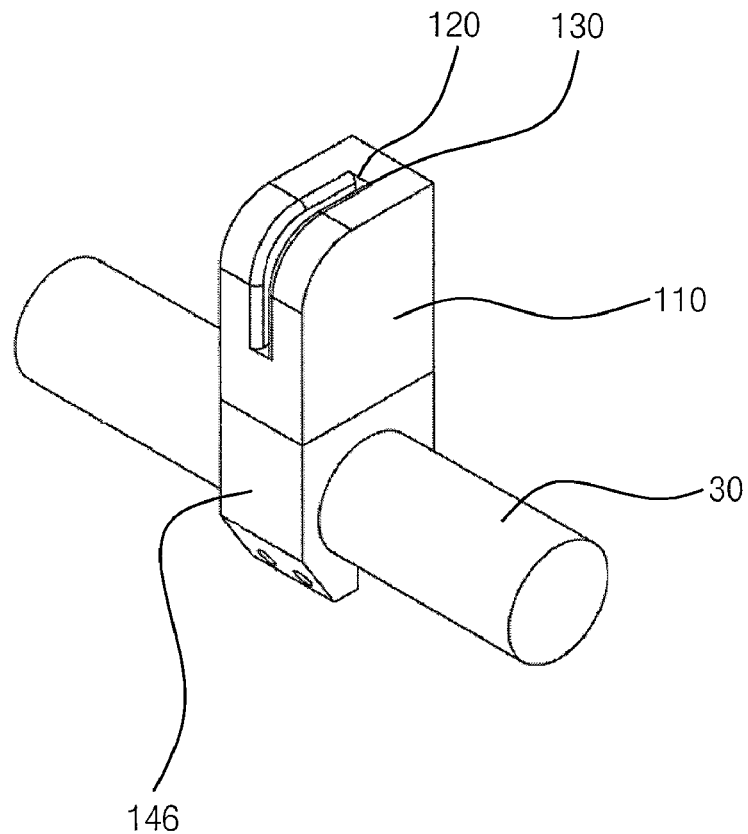
FIG. 17A is a perspective view illustrating illustrating a status of the mounting member in FIG. 1 being mounted on an object.
Figure 17B:
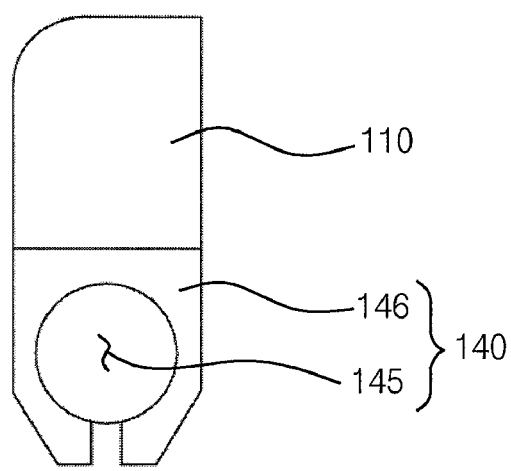
FIG. 17B is a side view of the mounting member in FIG. 17A.

FIG. 17A is a perspective view illustrating illustrating a status of the mounting member in FIG. 1 being mounted on an object. FIG. 17B is a side view of the mounting member in FIG. 17A.

Referring to FIGS. 17A and 17B, a mounting member 100 according to an embodiment of the present invention includes a body 110, a slot portion 120, a pressing portion 130 and an attaching part 140 in order to mount a mobile device accessory on an object.

A detailed description of the body 110, the slot portion 120, and the pressing portion 130 is substantially the same as that of the body 110, the slot portion 120, and the pressing portion 130 with reference to 130 of FIGS. 1 to 3B, thus to be omitted.

Further, the mounting member 100 may further include the pressurizing part 150, the pressurizing part 152, the pressurizing part 156, the pressurizing part 157 or the release preventing part 160 as illustrated with reference to FIGS. 4 to 11.

The attaching part 140 is coupled to a lower surface of the body 110. For example, the attaching part 140 and on a lower surface of the body 110 are connected to each other by the screw coupling structure, the sliding coupling structure or the sliding coupling structure and the hook coupling structure.

The attaching part 140 includes a clamp 146 formed with a through-hole 145 in a horizontal direction. The object 30 may be fixed to the clamp 146 along the through-hole 145.

The mounting member according to the present invention can stably mount both the mobile device and the accessory having the ring and being attached to one side of the mobile device to the object.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention.

What is claimed is:

1. A mounting member for mounting a mobile device and a mobile device accessory of being fixed to one face of the mobile device and having a ring on an object, the mounting member comprising:
    a body;
    a slot portion being formed in a part of the body and having a receiving groove for receiving the ring;
    a pressing portion disposed in close contact with a side wall of the receiving groove and configured to elastically press the ring to be located in the receiving groove and;
    a release preventing part being disposed to penetrate through a sidewall of the body in a horizontal direction to fix the ring received in the receiving groove to prevent the ring from being released from the receiving groove
    wherein the pressing portion is made of an elastic material so that slippage of the ring located in the receiving groove is suppressed and wear of the pressing portion is suppressed,
    wherein the slot portion and the pressing portion are formed parallel to each other
    wherein the release preventing part comprises:
    a push portion being provided inside the body to surround the slot portion, and having a button movable in the horizontal direction by a force externally pressed at one end;
    a hook formed at the other end of the push portion and adapted to fix the ring in the receiving groove as the ring is received in the receiving groove; and
    an elastic member being adjacent to the hook and being resiliently connected to the push portion to fix the hook in the receiving groove.

2. The mounting member of claim 1, wherein the pressing portion includes polymer resin.

3. The mounting member of claim 1, wherein the body includes a fastening portion formed on a lower surface of the body to be fastened to the object by a screw or a sliding method.

4. The mounting member of claim 1, further comprising an attaching part to attach a lower surface of the body to the object.

5. The mounting member of claim 4, wherein the attaching part comprises:
    a base housing coupled to a lower surface of the body; and
    an adhesive member interposed between a lower surface of the base housing and the object to providing an adhesive force therebetween.

6. The mounting member of claim 4, wherein the attaching part comprises:
    a base housing coupled to a lower surface of the body;
    a base bottom plate disposed at a lower face of the base housing; and
    a suction plate being configured to be fastened to the base housing through the base bottom plate and to adsorb the object.

7. The mounting member of claim 4, wherein the attaching part comprises a clamp being coupled to a lower surface of the body and having a through-hole formed in a horizontal direction.

8. A mounting member for mounting a mobile device and a mobile device accessory of being fixed to one face of the mobile device and having a ring on an object, the mounting member comprising:
    a body;
    a slot portion being formed in a part of the body and having a receiving groove for receiving the ring; and a release preventing part being disposed to penetrate through a sidewall of the body in a horizontal direction to fix the ring received in the receiving groove to prevent the ring from being released from the receiving groove, wherein the release preventing part comprises:
- a push portion being provided inside the body to surround the slot portion, and having a button movable in the horizontal direction by a force externally pressed at one end;
- a hook formed at the other end of the push portion and adapted to fix the ring in the receiving groove as the ring is received in the receiving groove; and
- an elastic member being adjacent to the hook and being resiliently connected to the push portion to fix the hook in the receiving groove.

\* \* \* \* \*